US008599423B2

(12) United States Patent
Ohhashi

(10) Patent No.: US 8,599,423 B2
(45) Date of Patent: Dec. 3, 2013

(54) METHOD AND APPARATUS FOR IMAGE PROCESSING, AND COMPUTER PROGRAM PRODUCT

(75) Inventor: Naoya Ohhashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1103 days.

(21) Appl. No.: 12/430,269

(22) Filed: Apr. 27, 2009

(65) Prior Publication Data
US 2009/0279141 A1    Nov. 12, 2009

(30) Foreign Application Priority Data
May 12, 2008 (JP) ................................ 2008-124779

(51) Int. Cl.
*G06K 15/00* (2006.01)
(52) U.S. Cl.
USPC .......................................... 358/1.16; 710/57
(58) Field of Classification Search
None
See application file for complete search history.

(56) References Cited

U.S. PATENT DOCUMENTS

| 5,542,076 | A  | * | 7/1996  | Benson et al. | ................ | 710/260 |
| 7,231,412 | B2 | * | 6/2007  | Hitz et al.    | ..............   | 1/1     |
| 2003/0156129 | A1 | * | 8/2003 | Takahashi et al. | ........... | 345/700 |
| 2004/0264935 | A1 | * | 12/2004 | Nakajima | ...................... | 386/95 |
| 2006/0028696 | A1 | * | 2/2006 | Michiie et al. | ................ | 358/474 |
| 2007/0074043 | A1 | * | 3/2007 | Lacey | .......................... | 713/186 |

FOREIGN PATENT DOCUMENTS

| JP | 2001-88369  | 4/2001 |
| JP | 2002-140286 | 5/2002 |
| JP | 2006-44157  | 2/2006 |
| JP | 3967074     | 6/2007 |

* cited by examiner

*Primary Examiner* — Twyler Haskins
*Assistant Examiner* — Lennin RodriguezGonzalez
(74) *Attorney, Agent, or Firm* — Oblon, Spivak, McClelland, Maier & Neustadt, L.L.P.

(57) ABSTRACT

In an image processing apparatus, an image memory handler (IMH) sets an engine descriptor for an engine unit and a virtual descriptor for a virtual video input driver, thereby controlling moving of image data from a local memory (MEM) to a hard disk drive (HDD). In a process in which the engine unit writes the image data into the MEM in such a manner defined by settings described in the engine descriptor, the virtual video input driver handles occurrence of an interrupt to a PCI direct access in such a manner that the image data is moved from the MEM to the HDD properly.

11 Claims, 7 Drawing Sheets

METHOD AND APPARATUS FOR IMAGE PROCESSING, AND COMPUTER PROGRAM PRODUCT

CROSS-REFERENCE TO RELATED APPLICATIONS

The present application claims priority to and incorporates by reference the entire contents of Japanese priority document 2008-124779 filed in Japan on May 12, 2008.

BACKGROUND OF THE INVENTION

1. Field of the Invention

The present invention relates to a technology for moving image data from a volatile memory to a nonvolatile memory.

2. Description of the Related Art

Printers that can print a longer-than-standard image are known in the art. Such a printer first writes image data to be printed into a volatile memory such as a random access memory (RAM), and then moves the image data page by page from the volatile memory to a nonvolatile memory such as a hard disk drive (HDD) thereby preventing occurrence of a memory full error in the volatile memory. However, if the image data is moved from the volatile memory to the HDD at the end of each page, when the image data of a page is too large, the volatile memory becomes full in the middle of the writing of the image data corresponding to the page. To solve the problem, Japanese Patent Application Laid-open No. 2006-44157 discloses a technology to efficiently prevent the memory full error by separating the volatile memory into several memory areas each having a certain amount, and moving the image data from the volatile memory to the nonvolatile memory in consideration of usage of the volatile memory. There is disclosed another technology to print the image with no break and no memory full error by moving the image data from the volatile memory to the nonvolatile memory, toggling between the memory areas of the volatile memory.

The data moving technique is used in a process of scanning the longer-than-standard image by a scanner engine. More particularly, the image data obtained by the scanner engine is stored in the volatile memory by using a function of an application specific integrated circuit (ASIC) and a video input device. When a predetermined amount of the image data is stored in the volatile memory, an interrupt event called "chain interrupt" occurs. The chain interrupt acts as a trigger to move the image data from the volatile memory to the nonvolatile memory.

However, the above process is effective only when the image data is monochrome. If the image data is color image data, three video input devices for red (R), green (G), and blue (B) or four video input devices for yellow (Y), magenta (M), cyan (C), and black (K) are required. Although a scanning speed of the video input devices is high enough in scanning of the monochrome image, the scanning speed generally drops to a not-enough level in scanning of the color image where the video input devices simultaneously receive inputs of the different colors. Taking those conditions into consideration, a technology to implement a high-enough scanning performance by using a peripheral component interconnect (PCI) direct access, an interrupt to the PCI direct access, and an engine descriptor as a hardware function has been disclosed.

It is noted that in the process in which the scanner engine writes the obtained image data into the volatile memory by using the PCI direct access and the interrupt to the PCI direct access, the scanner engine uses a writing start address and a data size that are specified by a controller. The controller controls access to the volatile memory. In a case of scanning the longer-than-standard image, because the controller specifies the data size before the total data size is measured, the controller specifies a reference size as the data size. If the total data size is larger than the reference size, the controller corrects the writing start address and the data size, which causes an additional load on the scanner engine. On the other hand, the scanner engine is required to scan the longer-than-standard image with no break. In those conditions, the additional load caused by the correction of the writing start address and the data size by the controller may temporarily stop the scanning operation of the scanner engine. Moreover, if the size of the image data is larger than a physical memory capacity of the volatile memory, the scanner engine has to stop the scanning operation temporarily. The toggling between the memory areas of the volatile memory by using the engine descriptor makes the writing of the longer-than-standard image data with no break possible, even when the physical memory capacity of the volatile memory is limited.

The scanner engine acts as a master of a direct memory access (DMA) transfer for writing of the image data to the volatile memory. Therefore, the controller cannot directly obtain logs about the writing operation. It means that, there is possibility that the controller cannot move the image data from the volatile memory to the HDD until receiving a notice of completion of the writing from the scanner engine. In other words, when the longer-than-standard image data is scanned, there is possibility that the controller cannot properly control timing to move the image data from the volatile memory to the HDD. Moreover, even if the timing is correct, there is possibility that improper image data, such as old image data or already-written image data, is moved to the HDD.

SUMMARY OF THE INVENTION

It is an object of the present invention to at least partially solve the problems in the conventional technology.

According to an aspect of the present invention, there is provided an image processing apparatus including a scanning unit that scans an image of an original to obtain image data; a first storage unit configured to temporarily store therein data; a first setting unit that sets at least one descriptor indicative of a range of a memory space in the first storage unit into which target image data is to be written, the target image data being whole or a part of the image data obtained by the scanning unit; a writing unit that writes the target image data into the range of the memory space of the first storage unit defined by the descriptor; a second setting unit that sets, based on the descriptor, a reference condition for generating an interrupt with respect to writing of the target image data to the first storage unit by the writing unit; an interrupt generating unit that generates, when the reference condition is satisfied, the interrupt to interrupt writing of the target image data to the first storage unit by the writing unit; and a storage control unit that moves, when the interrupt generating unit has generated the interrupt, the image data from the first storage unit to a second storage unit.

According to another aspect of the present invention, there is provided a method of image processing that is used in an image processing apparatus, the image processing apparatus including a first storage unit configured to temporarily store therein data. The method including scanning an original to obtain image data; setting at least one descriptor indicative of a range of a memory space in the first storage unit into which target image data is to be written, the target image data being whole or a part of the image data obtained at the scanning;

writing the target image data into the range of the memory space of the first storage unit defined by the descriptor; setting, based on the descriptor, a reference condition for generating an interrupt with respect to writing of the target image data to the first storage unit at the writing; generating an interrupt, when the reference condition is satisfied, to interrupt writing of the target image data to the first storage unit at the writing; and moving the image data, when the interrupt has been generated at the generating, from the first storage unit to a second storage unit.

According to still another aspect of the present invention, there is provided a computer program product that includes a computer-readable recording medium that stores therein computer program codes which when executed on a computer cause the computer to realize the above method of image processing on an image processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
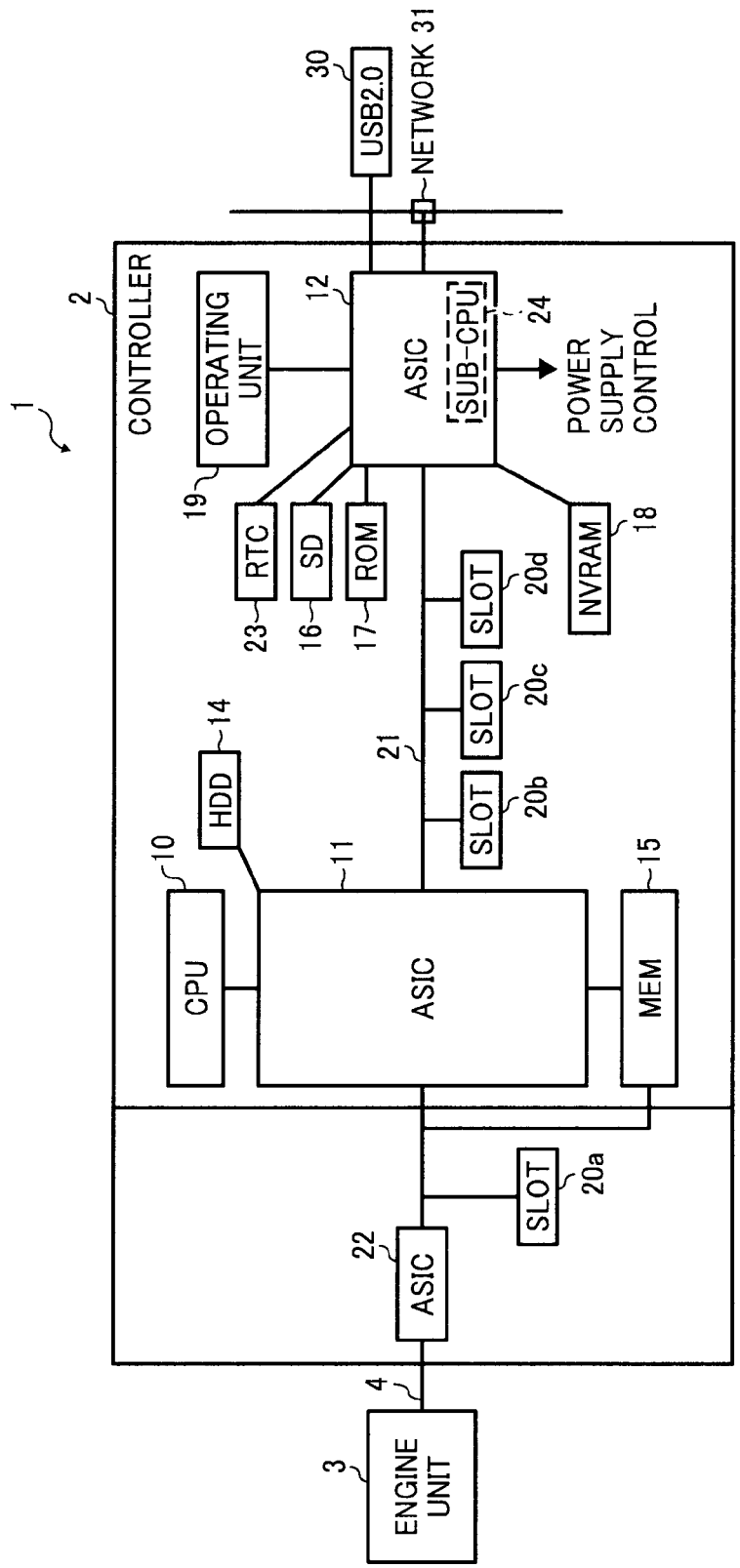
FIG. 1 is a block diagram of a hardware configuration of an image processing apparatus according to an embodiment of the present invention.

FIG. 1 is a block diagram of a hardware configuration of an image processing apparatus 1 according to an embodiment of the present invention. The image processing apparatus 1 includes a controller 2 and an engine unit 3 that are connected to each other via a PCI bus 4. The controller 2 controls the image processing apparatus 1. The engine unit 3 includes, although not shown, a scanner, a printer engine such as a black-and-white plotter, a single-drum color plotter, or a four-drum color plotter, and a facsimile unit. The engine unit 3 includes, although not shown, an image processing unit that processes image data and thereby creates, for example, an error-diffused data and a gamma-transformed data from the image data.

The controller 2 includes a central processing unit (CPU) 10, three ASICs 11, 12, 22, an HDD 14, a local memory (MEM) 15, a secure digital memory (SD memory) 16, a read only memory (ROM) 17, a nonvolatile random access memory (NVRAM) 18, an operating unit 19, a real time clock (RTC) 23, and four slots 20a to 20d. The ASIC 11 is connected to the CPU 10, the HDD 14, and the MEM 15. The ASIC 12 is connected to the operating unit 19, the SD memory 16, the ROM 17, the NVRAM 18, and the RTC 23. The ASIC 12 is connected to a universal serial bus (USB) 30 and a network 31. The ASIC 22 is connected to the engine unit 3 and the MEM 15. The ASICs 11, 12, and 22 are connected to each other via a bus 21. The slots 20a to 20d are used to connect the controller 2 to various subsystems that are not shown.

The CPU 10 is a main control unit that controls the image processing apparatus 1 by executing various software programs stored in the ROM 17 and the HDD 14. The operating unit 19 receives various instructions from a user such as an image scanning instruction. The ROM 17 stores therein various software programs and various data. The NVRAM 18 is a writable and readable memory that temporarily stores therein various software programs, various data, and image data that is created in a process of printing. The SD memory 16 stores therein various software programs and various data. The RTC 23 is a chip for a system clock.

The ASICs 11, 12, and 22 are integrated circuits for image processing. The ASICs 11, 12, and 22 include, although not shown, various hardware components such as a video output (VOUT) device, a compressor/de-compressor (CEP), and a first-in first-out (FIFO) buffer. The ASIC 11 controls access to the HDD 14. The HDD 14 stores therein various data, such as the image data, font data, and form data, and various software programs. The ASIC 12 includes a sub-CPU 24. The sub-CPU 24 controls the image processing apparatus 1 when the image processing apparatus 1 is in an energy-saving mode. The ASIC 22 can issue an interrupt to a video input (VIN) device or a PCI direct access, and controls access from the engine unit 3 to the MEM 15 by issuing the interrupt. The engine unit 3 can access the MEM 15 through the PCI direct access directly without the ASIC 22. The MEM 15 is a buffer that stores therein various data such as the image data in a copy process and code data in a coding process. The MEM 15 includes a plurality of image memory areas that stores therein the image data. The image memory areas are arranged in a predetermined order. As described later, by toggling between the image memory areas based on the predetermined order, the MEM 15 is used as a ring buffer.

Figure 2:
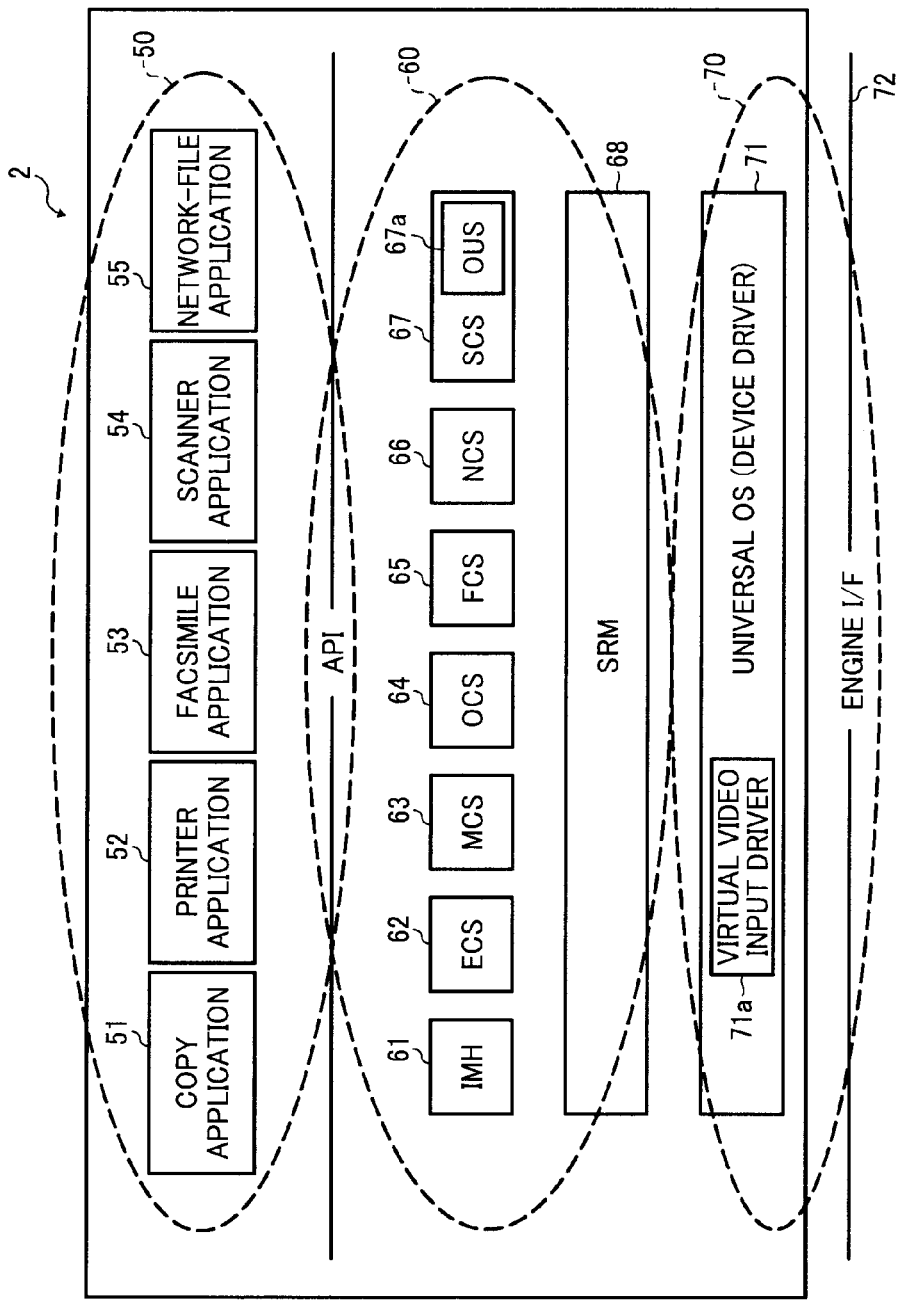
FIG. 2 is a block diagram of a software configuration of the image processing apparatus shown in FIG. 1.

The software configuration of the image processing apparatus 1 is described with reference to FIG. 2. The image processing apparatus 1 includes an application layer 50, a service layer 60, and an operating system (OS) layer 70 as software. Those layers are implemented by execution of corresponding software programs stored in the SD memory 16 and the ROM 17. To implement following functions of those layers, the CPU 10 reads the software programs from the SD memory 16 and the ROM 17, loads the software programs on the NVRAM 18, and executes the software programs.

The application layer 50 includes a copy application 51 for a copier, a printer application 52 for a printer, a facsimile application 53 for a facsimile machine, a scanner application 54 for a scanner, and a network-file application 55 for a network file. The printer application 52 includes a page-description language (PDL) such as a printer control language (PCL) and PostScript (PS).

The service layer 60 interprets a processing request received from the application layer 50, and issues, based on a result of the interrupt, a request to access to a corresponding hardware resource including the engine unit 3, the operating unit 19, and the memories such as the HDD 14, the MEM 15, the SD memory 16, the ROM 17, and the NVRAM 18. The service layer 60 includes an image memory handler (IMH) 61, an engine control service (ECS) 62, a memory control service (MCS) 63, an operation panel control service (OCS) 64, a facsimile control service (FCS) 65, a network control service (NCS) 66, a system control service (SCS) 67, and a system resource manager (SRM) 68 as service modules.

The ECS 62 controls the engine unit 3 as process modules. The MCS 63 performs memory control as process modules, such as allocation/deallocation of a memory for data storage, release of the memory, usage of the HDD 14, and compression/decompression of the image data. The OCS 64 controls the operating unit 19 as process modules. The FCS 65 provides an API related to the facsimile communications as process modules. The NCS 66 provides software programs requiring a network input/output (I/O) with sharable services as process modules. The SCS 67 performs various processing as process modules, such as software management, control of the operating unit 19, screen display, management of the hardware resources, and interrupt software control. The SCS 67 includes an on-demand update service (OUS) 67a. The OUS 67a controls on-demand update of the various software programs. The SRM 68 arbitrates between requests receives from the service layer 60 through management of the hardware resources with the SCS 67.

The IMH 61 sets later-described descriptors for the engine unit 3 and a later-described virtual video input driver 71a, and stores the descriptors in the MEM 15. The IMH 61 controls moving of the image data from the MEM 15 to the HDD 14.

The OS layer 70 includes a device driver 71 and an engine interface (I/F) 72. The engine I/F 72 transfers data between the controller 2 and the engine unit 3. The device driver 71 performs data communications with the engine unit 3, more particularly, receives/sends the image data from/to the engine unit 3. The device driver 71 includes the virtual video input driver 71a. The virtual video input driver 71a performs handling of an interrupt to the PCI direct access, and controlling of a register (not shown) of the ASIC 11. The handling of the interrupt will be described in details later.

The descriptors that the IMH 61 sets in the MEM 15 under control of the CPU 10 are described below. The descriptor for the engine unit 3 is called "engine descriptor", and the descriptor for the virtual video input driver 71a is called "virtual descriptor". The CPU 10 causes the IMH 61 to set the engine descriptor and the virtual descriptor, and store the engine descriptor and the virtual descriptor in the MEM 15. The engine descriptor represents a range of a memory space within which the engine unit 3 is to write the image data. The virtual descriptor represents the range of the memory space that is represented by the engine descriptor. The engine descriptor and the virtual descriptor work as a pair. The engine descriptor and the virtual descriptor are stored in a memory area of the MEM 15 other than the above-described image memory areas. The range of the memory space represented by the engine descriptor and the virtual descriptor is set to fall on a target one of the image memory areas that is decided according to the order of the image memory areas, so that the CPU 10 can use the image memory areas of the MEM 15, toggling between the image memory areas. When the descriptors representing the last image memory area as the range of the memory space are set by the CPU 10, the descriptors representing the first image memory area as the range of the memory space are then set by the CPU 10.

Figure 3:
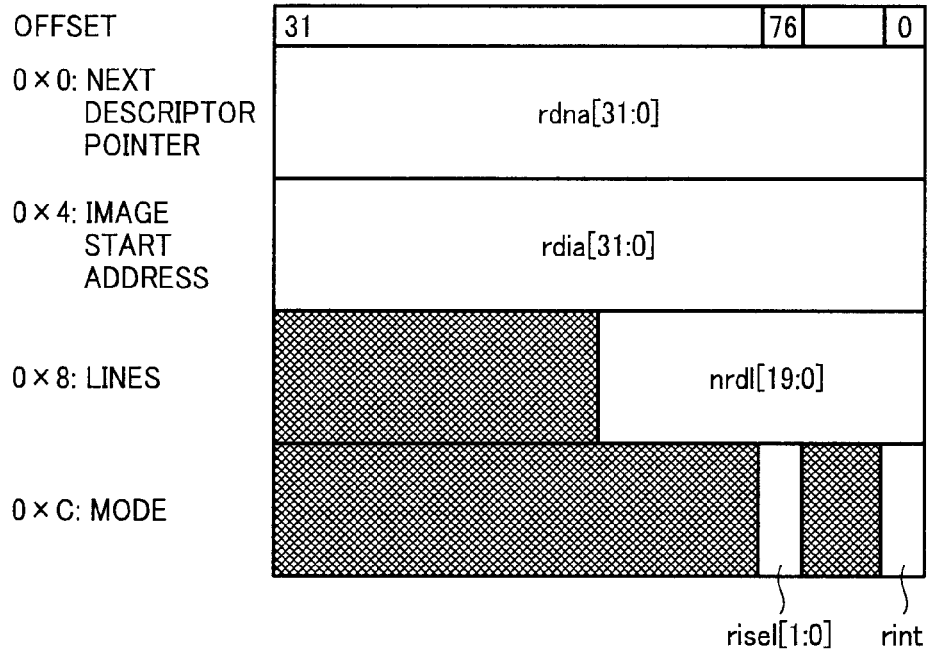
FIG. 3 is a schematic diagram of data structure of an engine descriptor according to the embodiment.

FIG. 3 is a schematic diagram of data structure of the engine descriptor according to the embodiment. Data "rdna[31:0]" (next descriptor pointer) is an address where the next descriptor is stored. Data "rdia[31:0]" (image start address) is a start address in a range beginning with which the image data is to be written. In a 32-bit transfer with a 4-byte unit, the lowest two bits are fixed to "00". In a 64-bit transfer with an 8-byte unit, the lowest three bits are fixed to "000". Data "nrdl[19:0]" (lines) is the number of available lines to which data can be written by using the descriptor. The number of lines represents the data size. Therefore, the engine descriptor describes that the image data, which is obtained by the scanner and is allocated to the engine descriptor, is to be written in the range of the memory space in the MEM 15 beginning with the start address indicated by "rdia[31:0]" and ending with an address by the number of lines indicated by "nrdl[19:0]" from the start address. The engine descriptor describes the address where the next engine descriptor is stored by using "rdna[31:0]". The range of the memory space described in the next engine descriptor is set to an image memory area other than the range of the memory space described in the preceding engine descriptor. Data "risel[1:0]" (mode) specifies a method of processing the image data. For example, if the value of "risel[1:0]" is "00", the image data is subjected to no processing. The value "01" is "reserve"; the value "10" is "all black (no PCI receiving); and the value "11" is "all white (no PCI receiving)".

Figure 4:
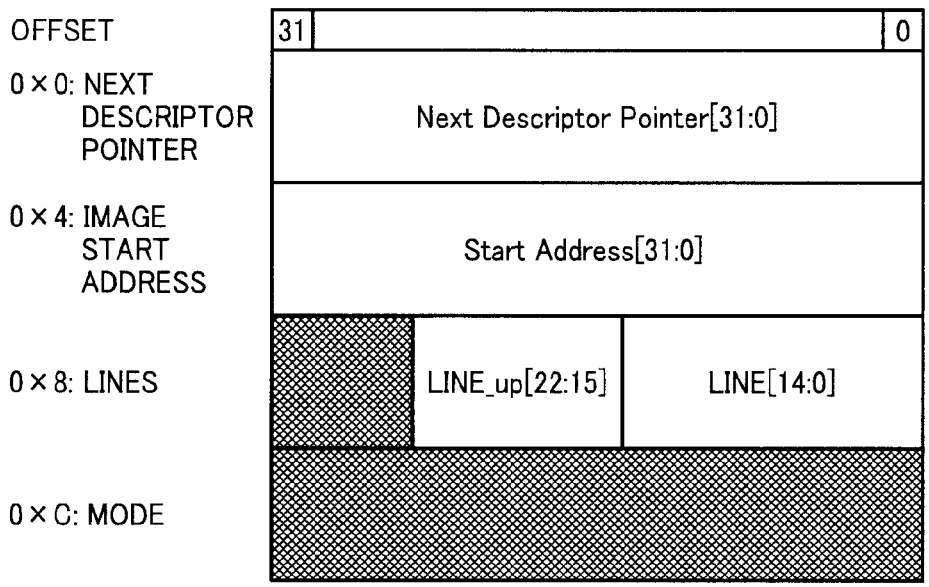
FIG. 4 is a schematic diagram of data structure of a virtual descriptor according to the embodiment.

FIG. 4 is a schematic diagram of data structure of the virtual descriptor according to the embodiment. Data "Next Descriptor Pointer[31:0]" (next descriptor pointer) is the address where the next descriptor is stored. Data "Start Address[31:0]" (image start address) is the start address in a range beginning with which the image data is to be written. In a 32-bit transfer with a 4-byte unit, the lowest two bits are fixed to "00". In a 64-bit transfer with an 8-byte unit, the lowest three bits are fixed to "000". Data "LINE_up[22:15]" (lines) and data "LINE[14:00]" (lines) are the number of available lines to which the engine unit 3 can write data by using the engine descriptor corresponding to the virtual descriptor. The data "LINE_up[22:15]" is an upper bit, and the data "LINE[14:00]" is a lower bit.

Figure 5:
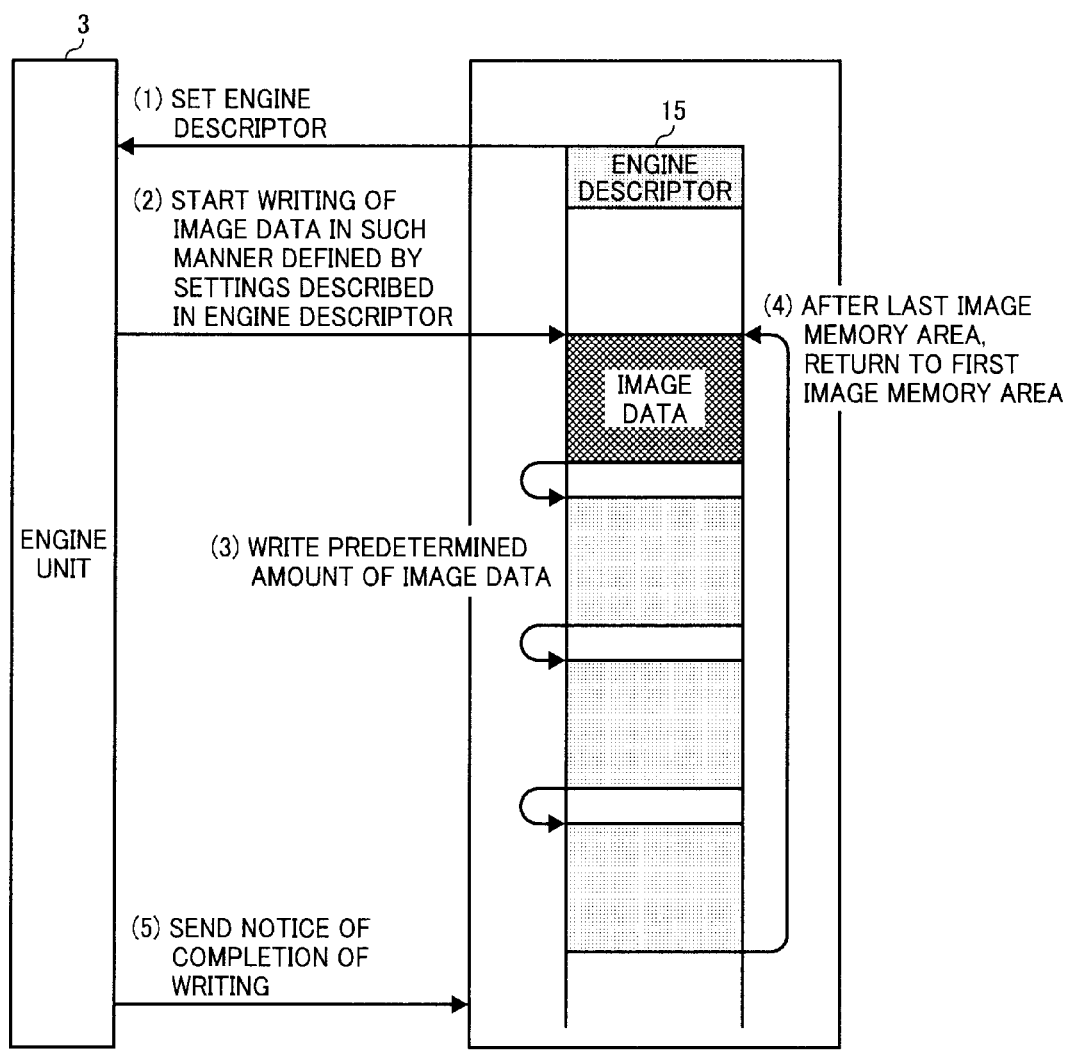
FIG. 5 is a schematic diagram for explaining a writing process in which an engine unit writes image data into an MEM by using the engine descriptor according to the embodiment.

The CPU 10 sets at least one pair of the engine descriptor and the virtual descriptor to each memory area of the MEM 15. The CPU 10 sets the engine descriptor and the virtual descriptor in such a manner that the CPU 10 can use the MEM 15, toggling between the memory areas. A writing process in which the engine unit 3 writes the image data into the MEM 15 by using the engine descriptor is described with reference to FIG. 5. Upon receiving an instruction to scan the image via the operating unit 19, the CPU 10 sets the engine descriptor for the MEM 15, and instructs the engine unit 3 to scan the image. In response to the instruction from the CPU 10, the engine unit 3 reads the engine descriptor from the memory area in the MEM 15, and writes the image data, which is created from the image that is obtained from the original by the scanner, to the MEM 15 through the PCI direct access in such a manner defined by the settings described in the engine descriptor. When the writing defined by the settings described in the engine descriptor is completed, the engine unit 3 accesses the next descriptor address indicated by the data "rdna[31:0]", reads the next engine descriptor, and writes the image data into the MEM 15 in such a manner defined by the settings described in the next engine descriptor. The engine unit 3 repeats the writing operation until the data "rdna[31:0]"

with a value of "0" appears. The engine descriptor is set in such a manner that the range of the memory space is returned to the first image memory area when the last image memory area becomes full. Therefore, the engine unit 3 writes the image data, toggling between the image memory areas of the MEM 15.

Figure 6:
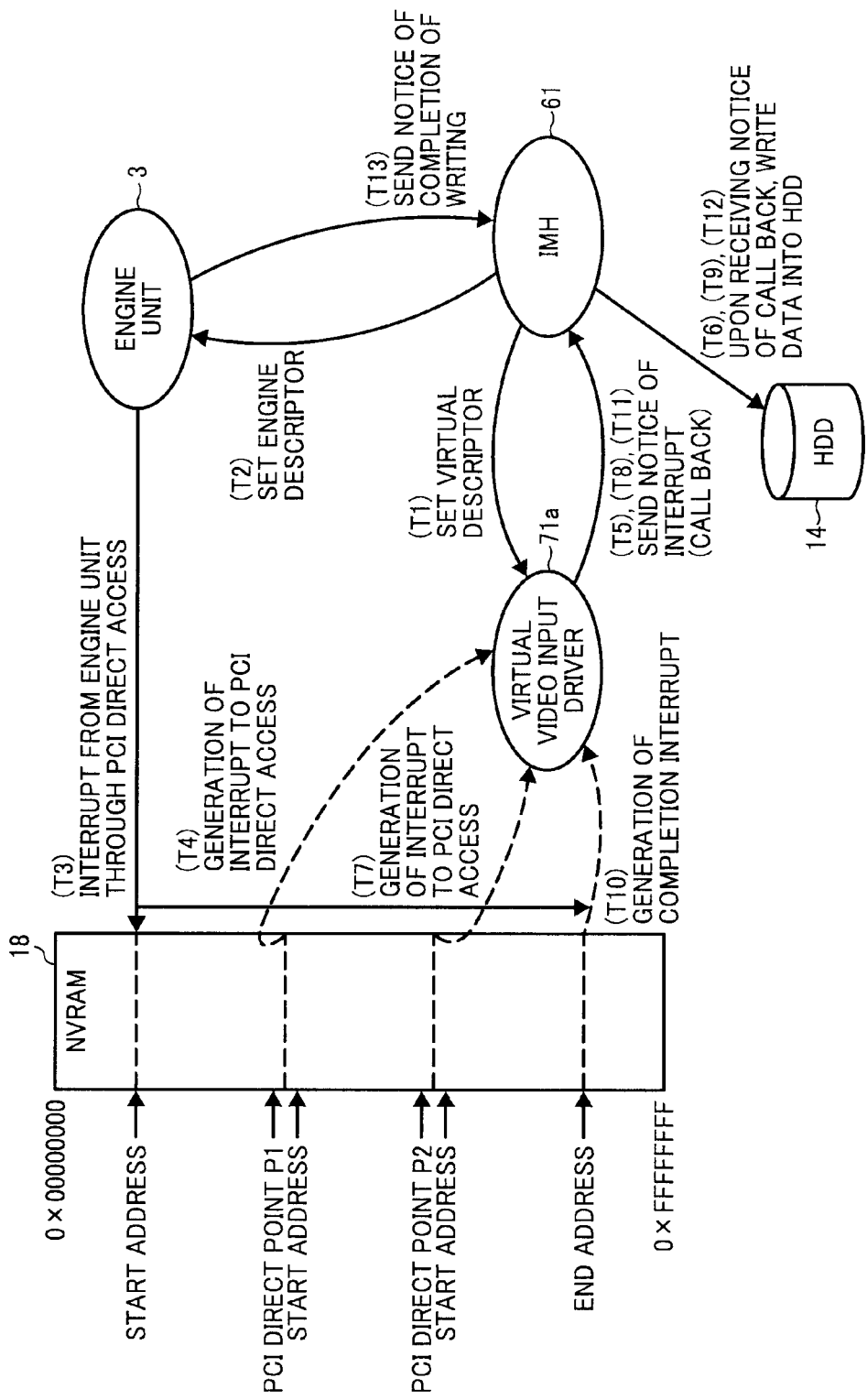
FIG. 6 is a schematic diagram for explaining a storing process in which the engine unit writes the image data into the MEM, and a CPU moves the image data from the MEM to an HDD according to the embodiment.

In the present embodiment, while the engine unit 3 writes the image data into the MEM 15 through the PCI direct access in such a manner defined by the settings described in the engine descriptor, the CPU 10 causes the virtual video input driver 71a to move the image data from the MEM 15 to the HDD 14 by handling generation of an interrupt to the PCI direct access. FIG. 6 is a schematic diagram for explaining a storing process in which the engine unit 3 writes the image data into the MEM 15, and the CPU 10 moves the image data from the MEM 15 to the HDD 14. Although no mention is made about the CPU 10 in the following description, the IMH 61 and the virtual video input driver 71a operate under control of the CPU 10. In reality, the image data corresponding to each color of R, G, and B or C, M, Y, and K is written to the MEM 15. However, to make the description simpler, the image data in the following description is assumed to be a single-color image data. The IMH 61 sets the virtual descriptor for the virtual video input driver 71a, and stores the virtual descriptor in the MEM 15 (Process T1). The IMH 61 sets the engine descriptor for the engine unit 3, and stores the engine descriptor in the MEM 15 (Process T2). When the engine descriptor is set, the engine unit 3 reads the next engine descriptor by referring to the next descriptor address described in the engine descriptor. The engine unit 3 accesses the MEM 15 through the PCI direct access, and writes the scanned image data into the range of the memory space beginning with the start address line by line in such a manner that is defined by the settings described in the engine descriptor (Process T3).

When the virtual descriptor is set, the virtual video input driver 71a sets PCI direct points P1 and P2 based on the virtual descriptor. The PCI direct points are reference conditions for generation of the interrupt to the PCI direct access. Each of the PCI direct points, more particularly, is an address of a point within the image memory area of the MEM 15. The virtual video input driver 71a calculates the PCI direct points from the image star address and the lines that are described in the virtual descriptor as shown in FIG. 3 by using the following Equation (1):

$$p = \text{image start address} + m\text{width} \times (\text{lines}-1) + i\text{width} \quad (1)$$

where p is the PCI direct point, mwidth is the number of words representing a width of the image memory area in the main-scanning direction, and iwidth is the number of bytes representing a width of the image to be scanned in the main-scanning direction. The virtual video input driver 71a stores values of mwidth and iwidth in the register of the ASIC 11.

Figure 7:
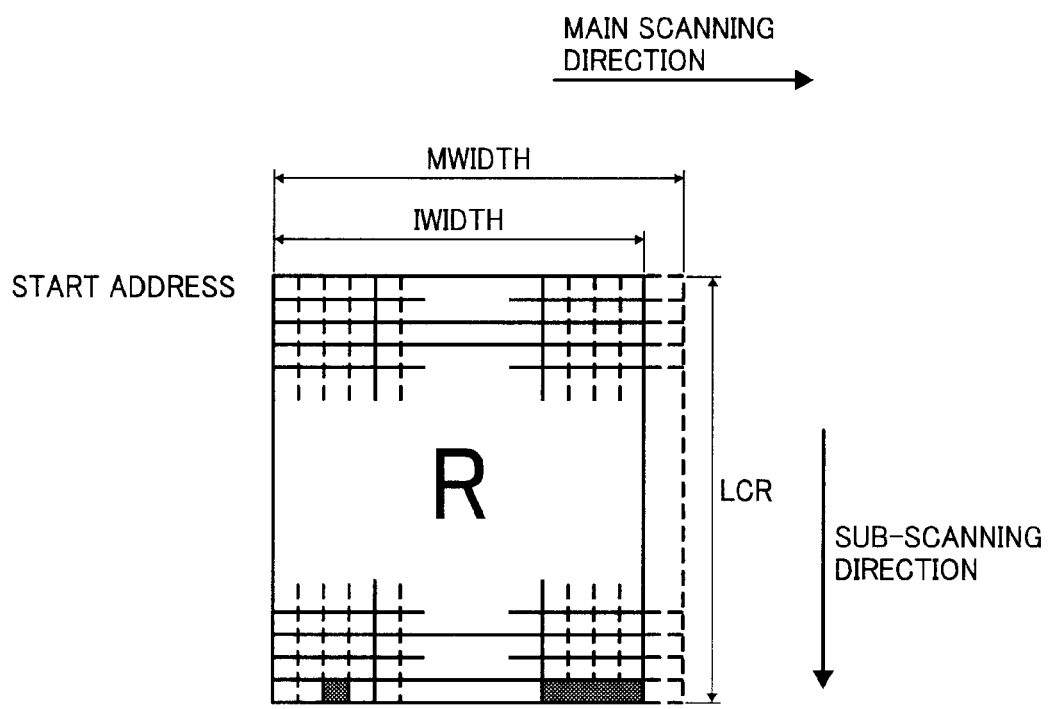
FIG. 7 is a schematic diagram of an original to be scanned for explaining a relation between mwidth and iwidth.

FIG. 7 is a schematic diagram of the original to be scanned for explaining a relation between the mwidth and the iwidth. The PCI direct point calculated by using Equation (1) represents an address of the end point within the range of the memory space described in the engine descriptor and the virtual descriptor. Therefore, the interrupt to the PCI direct access occurs when all the memory space within the range, which is described in the engine descriptor and the virtual descriptor, is filled with data. The virtual video input driver 71a calculates at least one PCI direct point, and stores the PCI direct point in the register of the ASIC 11. The PCI direct point is specified in each of the images separated based on color.

The ASIC 11 detects a state where an extent of the writing of the image data to the MEM 15 by the engine unit 3 reaches the PCI direct point that is set in the above manner. Upon detecting the state, the ASIC 11 causes the interrupt to the PCI direct access to occur (T4). When the interrupt occurs, the virtual video input driver 71a handles the interrupt, and sends a notice of generation of the interrupt to the IMH 61 (Process T5). Upon receiving the notice, the IMH 61 moves target image data from the MEM 15 to the HDD 14 (Process T6). The target image data that is moved from the MEM 15 to the HDD 14 is the image data that is stored within a period from the notice of the last interrupt to the notice of the current interrupt. If the current interrupt is the first interrupt, the target image data is the image data that is stored in a range beginning with the start address of the first image memory area. In this manner, the ASIC 11 causes the interrupt to occur each time when an extent of the writing of the image data to the MEM 15 by the engine unit 3 reaches the PCI direct point. In response to each interrupt, the IMH 61 moves the target image data from the MEM 15 to the HDD 14 (Processes T7 to T9). When all the image data is written to the MEM 15, the engine unit 3 sends a notice of completion of the writing (hereinafter, "completion interrupt") to the IMH 61 via the virtual video input driver 71a (Processes T10 and T11). Upon receiving the notice of the completion of the writing, the IMH 61 moves the remaining image data from the MEM 15 to the HDD 14 (Process T12), and sends a notice of completion of the storing process (Process T13). Thus, the process control goes to end.

Figure 8:
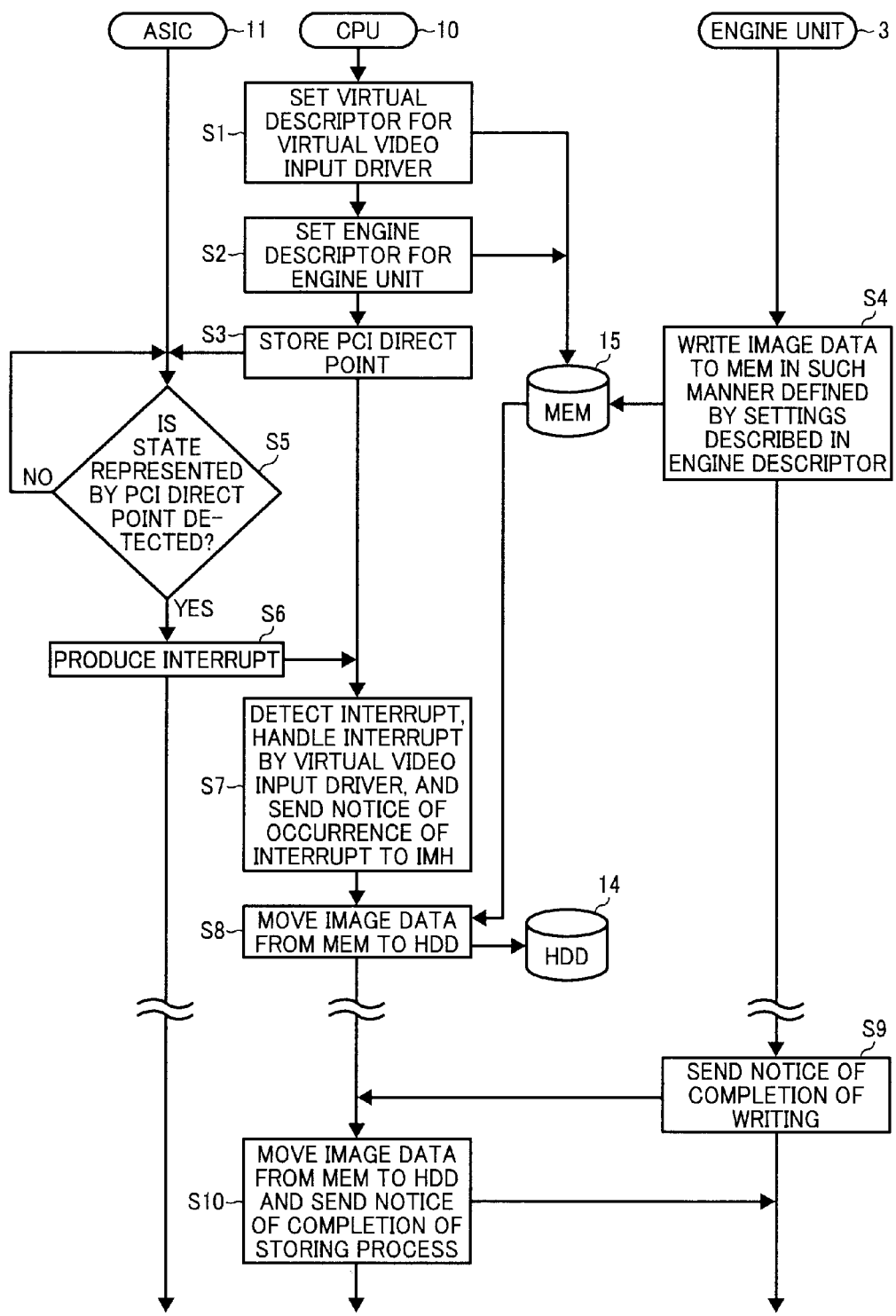
FIG. 8 is a flowchart of the storing process in which the image processing apparatus first writes the image data into the MEM, and then moves the image data from the MEM to the HDD according to the embodiment.

The storing process in which the image processing apparatus 1 writes the image data into the MEM 15, and then moves the image data from the MEM 15 to the HDD 14 is described in detail with reference to FIG. 8. The CPU 10 causes the IMH 61 to set the virtual descriptor for the virtual video input driver 71a and store the virtual descriptor in the MEM 15 (Step S1). The CPU 10 causes the IMH 61 to set the engine descriptor for the engine unit 3 and store the engine descriptor in the MEM 15 (Step S2). The CPU 10 causes the virtual video input driver 71a to calculate the PCI direct point based on the virtual descriptor, and store the calculated PCI direct point in the register of the ASIC 11 (Step S3). The engine unit 3 reads the engine descriptor from the MEM 15, accesses the MEM 15 through the PCI direct access, and writes, in such a manner defined by the settings described in the obtained engine descriptor, the image data that is obtained by the scanner into the range of the memory space in the MEM 15 beginning with the start address line by line (Step S4).

When the ASIC 11 detects the state where an extent of the writing of the image data to the MEM 15 by the engine unit 3 reaches the PCI direct point that is set in the above manner (Yes at Step S5), the ASIC 11 causes the interrupt to the PCI direct access to occur (Step S6). When the interrupt occurs, the CPU 10 causes the virtual video input driver 71a to handle the interrupt and send the notice of generation of the interrupt to the IMH 61 (Step S7). The CPU 10 causes the IMH 61 to move the image data from the MEM 15 to the HDD 14 by using the notice of the interrupt as the trigger (Step S8). Although not shown in FIG. 8, the processes of Steps S6 to S8 are performed each time when an extent of the writing of the image data to the MEM 15 by the engine unit 3 reaches the PCI direct point. When all the image data obtained by the scanner have been written, the engine unit 3 sends the notice of completion of the writing to the CPU 10 (Step S9). The CPU 10 causes the virtual video input driver 71a to receive the notice. Upon receiving the notice, the CPU 10 causes the IMH 61 to move the remaining image data from the MEM 15 to the HDD 14. After that, the CPU 10 causes the IMH 61 to send the notice of completion of the storing process to the engine unit 3 (Step S10), and the process control goes to end. After the storing process, the engine unit 3 processes the image data stored in the HDD or the MEM 15, and prints out the processed image.

In this manner, based on usage of the PCI direct access, the interrupt to the PCI direct access, and the engine descriptor, the image processing apparatus 1 moves by using the virtual video input driver 71a the image data from the MEM 15 to the HDD 14 by handling the generation of the interrupt to the PCI direct access. With this configuration, the controller 2 can control the timing to move the image data from the MEM 15 to the HDD 14. Therefore, even if the scanner is scanning such a large color image from the original that the total size of which cannot be detected at the start of the scanning, the storing process is performed with no break, without stopping the scanning operation by the scanner of the engine unit 3 and with no memory full error.

The present invention is not to be limited to the present embodiment, but is to be construed as embodying all modifications and alternative constructions within the scope of the present invention. It is possible to provide another embodiment by combining any of the components disclosed in the present embodiment. For example, it is possible to delete some of the components from the embodiment. It is allowable to combine components described in the different embodiments. The present embodiment can be modified in various manners as follows.

In the present embodiment, the software programs to be executed by the CPU 10 of the image processing apparatus 1 can be stored in a computer connected to the image processing apparatus 1 via a network such as the Internet, and downloaded to the image processing apparatus 1 via the network. The software programs can be stored, in a form of a file that is installable and executable on the image processing apparatus 1, in a recording medium readable by the image processing apparatus 1, such as a compact disk-read only memory (CD-ROM), a flexible disk (FD), a compact disk-recordable (CD-R), and a digital versatile disk (DVD).

Moreover, although an example is explained above in which the engine unit 3 of the image processing apparatus 1 includes the scanner, the printer engine, and the facsimile unit, it is allowable to configure the engine unit 3 to include only the scanner.

Furthermore, although the MEM 15 is used as a temporary storage unit to store the image data, some other storage unit, such as the NVRAM 18 and the SD memory 16, can be used as the temporary storage unit to store the image data.

Moreover, although the HDD 14 is used as a storage unit to store the image data that is once stored in the MEM 15, some other storage unit, such as the SD memory 16 and a USB memory that is connected to the image processing apparatus 1 via the USB 30, can be used to store the image data.

Furthermore, although an example is explained above in which the controller 2 of the image processing apparatus 1 includes the HDD 14, the controller 2 can be configured to include no HDD. If the controller 2 includes no HDD, the CPU 10 moves the image data from the MEM 15 to a storage unit, such as an HDD, of another image processing apparatus at Step S8.

The writing process in which the engine unit 3 writes the image data into the MEM 15 has been described in the above embodiment. In the writing process, the engine unit 3 can write coded data that is created by coding the image data into the MEM 15 instead of the image data. If the coded data is written, the virtual video input driver 71a calculates the PCI direct point p by using the following Equation (2):

$$p = \text{image start address} + (\text{lines} \times 4) \tag{2}$$

The controller 2 can control the timing to move the coded data from the MEM 15 to the HDD 14 by using the calculated PCI direct point. Even if the scanner scans the longer-than-standard color image, no memory full error occurs.

It is allowable to calculate the PCI direct point by using some other Equations such that no memory full error occurs.

Moreover, it is allowable to store the predetermined PCI direct point in the ASIC 11 instead of calculating the PCI direct point based on the virtual descriptor by the virtual video input driver 71a.

As described above, the PCI direct point is specified in each of the images separated based on color. The number of the PCI direct points in each of the different-color images can be either equal or unequal.

The PCI direct point in the present embodiment is the address of the point within the image memory area of the MEM 15. However, the PCI direct point can represent other information that acts as a reference condition for generation of the interrupt to the PCI direct access.

According to an aspect of the present invention, timing to write image data into a volatile memory and timing to move the image data from the volatile memory to a nonvolatile memory are controlled properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a scanning unit that scans an image of an original to obtain image data;
a first storage unit configured to temporarily store therein data;
a first setting unit that sets two or more descriptors each indicative of a range of a memory space in the first storage unit into which target image data is to be written, the target image data being a part of the image data obtained by the scanning unit;
a writing unit that writes the target image data into the range of the memory space of the first storage unit defined by one of the descriptors repeatedly for each of the descriptors;
a second setting unit that sets, based on one of the descriptors, a reference address of a reference point in the first storage unit;
an interrupt generating unit that generates, when progress of the writing of the target image data to the first storage unit by the writing unit reaches the reference point, an interrupt; and
a storage control unit that moves, when the interrupt generating unit generates the interrupt, the image data from the range of the memory space of the first storage unit to a second storage unit,
wherein the writing unit continues repeating the writing of the target image data without interruption irrespective of generation of the interrupt by the interrupt generating unit wherein the reference condition is set such that the generated interrupt occurs when the writing of the target image data to the first storage unit reaches a reference point in the first storage unit, and
wherein the second setting unit further includes a calculating unit that determines the reference point based on:

the range of the memory space described in one of the descriptors, a width of a scanning line in main-scanning direction that is used in scanning of the image from the original by the scanning unit, and a width of the image in the main-scanning direction.

2. The image processing apparatus according to claim 1, wherein the first setting unit sets a first descriptor and a second descriptor as the descriptor, the first descriptor indicative of a first range of a memory space in the first storage unit to which first image data is to be written, the first descriptor including a next descriptor address indicative of a place where the second descriptor is stored, the second descriptor indicative of a second range of a memory space in the first storage unit to which second image data subsequent to the first image data is to be written, the second range being out of the first range, and the first image data and the second image data being a part of the image data, and the writing unit writes the first image data into the first range of the memory space by referring to the first descriptor, acquires the second descriptor by referring to the place where the second descriptor is stored that is described in the first descriptor, and writes the second image data into the second range of the memory space by referring to the second descriptor.

3. The image processing apparatus according to claim 1, wherein the first storage unit includes a plurality of image memory areas for storing therein data, the image memory areas being arranged in a predetermined order, and the first setting unit sets the descriptor in such a manner that the range of the memory space falls on a target image memory area that is decided according to the predetermined order, and after the first setting unit sets the descriptor having the range of the memory space falling on a last image memory area, the first setting unit sets the descriptor having the range of the memory space falling on a first image memory area.

4. The image processing apparatus according to claim 1, wherein the first setting unit sets the descriptor including a start address of a starting point of the range of the memory space, and a size of the target image data, thereby defining the range of the memory space.

5. The image processing apparatus according to claim 4, wherein the second setting unit includes a calculating unit that calculates the reference address from the range of the memory space described in the descriptor, a width of a scanning line in main-scanning direction that is used in scanning of the image from the original by the scanning unit, and a width of the image in the main-scanning direction; and a third setting unit that sets the reference address as calculated by the calculating unit.

6. The image processing apparatus according to claim 4, wherein the second setting unit includes a calculating unit that calculates the reference address such that the reference address corresponds to an ending point of the range of the memory space described in the descriptor.

7. The image processing apparatus according to claim 4, wherein the first setting unit sets at least one first descriptor indicative of the range of the memory space, and at least one second descriptor indicative of the range of the memory space described in the first descriptor, the writing unit writes the target image data into the range of the memory space by referring to the first descriptor, and the second setting unit sets the reference address based on the second descriptor.

8. The image processing apparatus according to claim 1, further comprising an image output unit that processes the image data stored in at least one of the first storage unit and the second storage unit thereby obtaining an image, and outputs the image.

9. The image processing apparatus according to claim 1, wherein the second setting unit sets the reference condition based on one of the descriptors such that the generated interrupt occurs before an end of the memory space is reached by the writing of the target image data to the first storage unit by the writing unit.

10. A method of image processing that is used in an image processing apparatus, the image processing apparatus including a first storage unit configured to temporarily store therein data, the method comprising:

scanning an original to obtain image data;

setting two or more descriptors each indicative of a range of a memory space in the first storage unit into which target image data is to be written, the target image data being a part of the image data obtained at the scanning;

writing the target image data into the range of the memory space of the first storage unit defined by one of the descriptors repeatedly for each of the descriptors;

setting, based on one of the descriptors, a reference address of a reference point in the first storage unit;

generating an interrupt, when progress of the writing of the target image data to the first storage unit by the writing unit reaches the reference point; and moving the image data, when the interrupt is generated at the generating, from the range of the memory space of the first storage unit to a second storage unit, wherein the writing of the target image data is continuously repeated without interruption irrespective of generation of the interrupt at the generating, and wherein the setting the reference address further includes determining the reference point based on:

the range of the memory space described in one of the descriptors, a width of a scanning line in main-scanning direction that is used in scanning of the image from the original by the scanning, and a width of the image in the main-scanning direction.

11. A computer program product that includes a non-transitory computer-readable recording medium that stores therein computer program codes which when executed on a computer cause the computer to realize a method of image processing on an image processing apparatus, the image processing apparatus including a first storage unit configured to temporarily store therein data, the computer program causing the computer to execute:

scanning an original to obtain image data;

setting two or more descriptors each indicative of a range of a memory space in the first storage unit into which target image data is to be written, the target image data being a part of the image data obtained at the scanning;

writing the target image data into the range of the memory space of the first storage unit defined by one of the descriptors repeatedly for each of the descriptors;

setting, based on one of the descriptors, a reference address of a reference point in the first storage unit;

generating an interrupt, when progress of the writing of the target image data to the first storage unit by the writing unit reaches the reference point; and moving the image data, when the interrupt is generated at the generating, from the range of the memory space of the first storage unit to a second storage unit, wherein the writing of the target image data is continuously repeated without interruption irrespective of generation of the interrupt at the generating, and wherein the setting the reference address further includes determining the reference point based on:
  the range of the memory space described in one of the descriptors,
  a width of a scanning line in main-scanning direction that is used in scanning of the image from the original by the scanning, and
  a width of the image in the main-scanning direction.

* * * * *